E. S. Purdy,
Cider and Wine Press.

N°62,884. Patented Mar. 12, 1867.

Witnesses:
F. A. Jackson,
Wm. Treurn.

Inventor:
E. S. Purdy.
Per Munn & Co.
Attorneys.

United States Patent Office.

EBENEZER S. PURDY, OF CROTON, NEW YORK.

Letters Patent No. 62,884, dated March 12, 1867.

---

IMPROVEMENT IN CIDER-MILLS.

---

The Schedule referred to in these Letters Patent and making part of the same.

---

TO ALL WHOM IT MAY CONCERN:

Be it known that I, EBENEZER S. PURDY, of Croton, in the county of Westchester, and State of New York, have invented a new and useful Mill for Grinding Grapes, Apples, and other Substances; and I do hereby declare that the following is a full, clear, and exact description thereof, which will enable those skilled in the art to make and use the same, reference being had to the accompanying drawings, forming part of this specification, in which—

Figure 1:
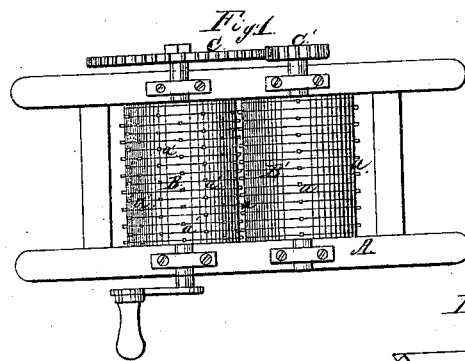

Figure 1 is a plan or top view of my invention, with the hopper removed.

Figure 2:
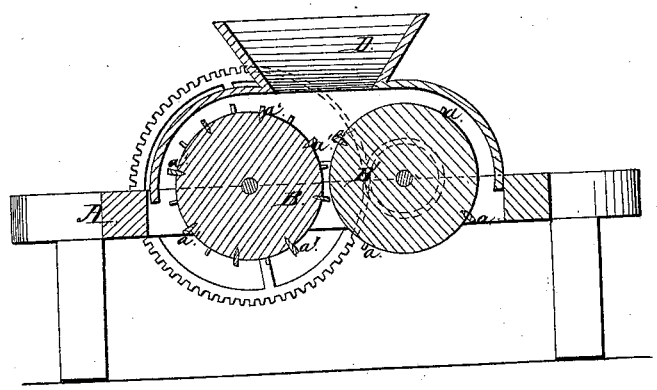
Figure 3:
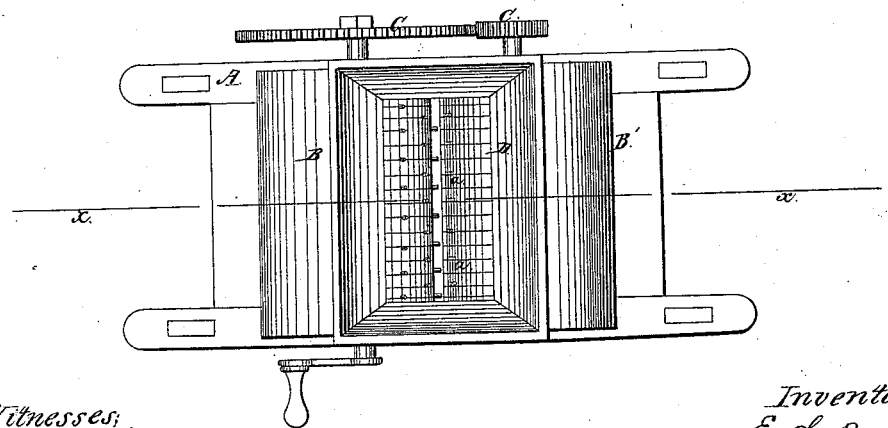

Figure 2, a side sectional view of the same, taken in the line $x\ x$, fig. 3.

Figure 3, a plan or top view of my invention, with the hopper upon it.

Similar letters of reference indicate corresponding parts.

This invention relates to a new and useful improvement in that class of mills for grinding grapes, apples, and other substances, in which rotary toothed cylinders are employed, and one cylinder made to rotate with a greater speed than the other. The invention consists in the alternate arrangement of the cutting teeth of both cylinders so that the teeth will pass closely between each other, but without impeding each other, thus finely grating and reducing the fruit or other substance without crushing the same.

A represents a frame, which may be constructed in any proper manner to support the working parts, and B B' are two cylinders, placed on said frame, and connected by gears C C', one of which, C, on the shaft of cylinder B, is considerably larger in diameter than the other, C', on the shaft of cylinder B', and the latter cylinder, B', therefore, rotates faster than cylinder B, the relative speed in this instance being four to one. The cylinder B' has four horizontal rows of teeth, $a$, upon it, standing at equal distances apart, and arranged upon alternate concentric lines, and the other cylinder, B, is provided with sixteen horizontal rows of teeth, $a'$, also arranged upon alternate concentric lines, the relative proportion of the number of rows of teeth on the respective cylinders corresponding to the relative speed of the respective cylinders. This combined horizontal and concentric alternate arrangement of the teeth upon the respective cylinders permits the several rows upon each cylinder to pass very closely between the teeth of the opposite cylinder without impediment; which action causes the grapes, apples, or other substances which come in contact with the teeth, to be very thoroughly pulped or grated, but not crushed, as in many other mills. The hopper D is placed over the cylinders in the usual way for the reception of the fruit or other substances that are to be acted upon by the mill.

By the alternate arrangement of the teeth $a\ a'$ on the cylinders B B', each set of teeth on one cylinder passing closely between those on the other cylinder, the apples or other substances to be ground will undergo a grating process, whereby no lumps will be formed, and thereby more of the juice of the fruit will be obtained.

I do not claim broadly the application of teeth to the cylinders of cider-mills; nor do I claim the construction and application of breakers to the cylinders when armed with teeth, as shown in Letters Patent No. 13,839, granted to W. O. Hickok, dated November 25, 1855, and reissued March 26, 1861; but what I do claim as my invention, and desire to secure by Letters Patent is—

The alternate arrangement of the teeth $a\ a'$ on the cylinders B B', the teeth of one cylinder passing closely between the teeth of the other cylinder, and adapted for grating the fruit instead of crushing it; the whole being constructed, arranged, and operated in the manner and for the purpose set forth.

EBENEZER S. PURDY.

Witnesses:
WM. F. McNAMARA,
ALEX. F. ROBERTS.